Oct. 27, 1964 A. A. KALINSKE ETAL 3,154,601
AERATOR
Filed Aug. 6, 1959 2 Sheets-Sheet 2

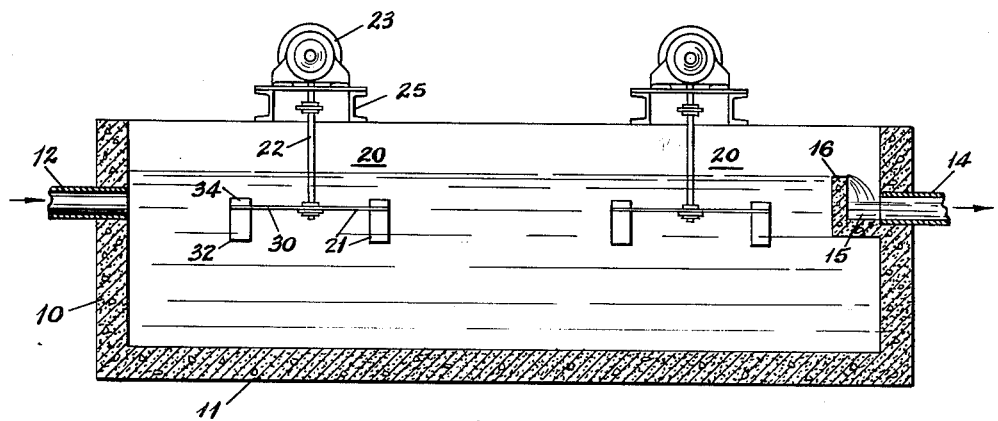
Fig. 1
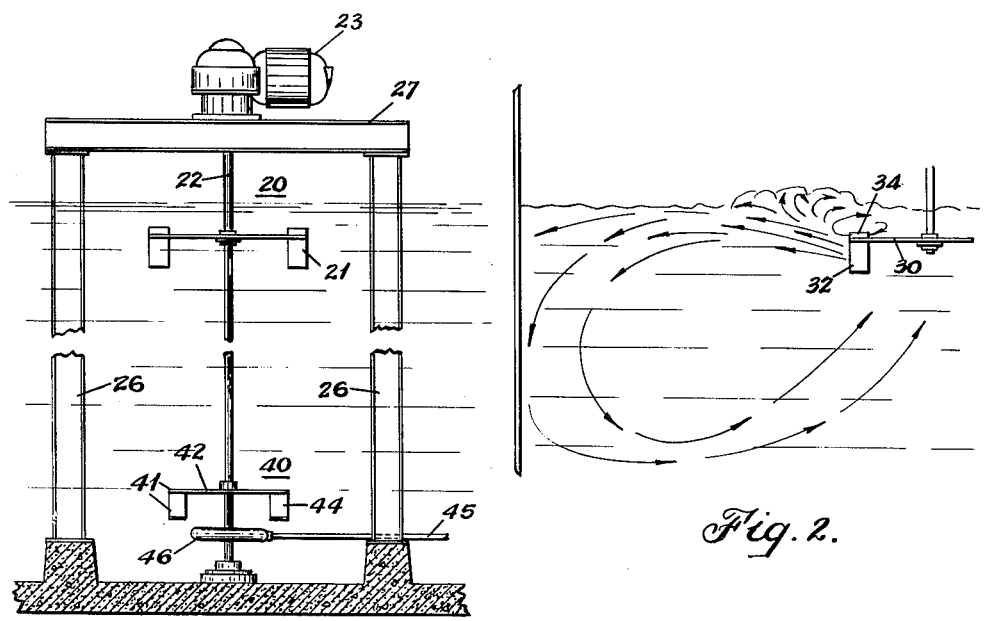
Fig. 2.
Fig. 3.

United States Patent Office 3,154,601
Patented Oct. 27, 1964

3,154,601
AERATOR
Anton A. Kalinske, Tucson, Ariz., and Roy F. Weston, Newtown Square, Pa., assignors, by direct and mesne assignments, to P. H. Glatfelter Company, Spring Grove, Pa., a corporation of Pennsylvania; Roy F. Weston Inc., Newtown Square, Pa., a corporation of Pennsylvania; and Fuller Company, Catasauqua, Pa., a corporation of Delaware
Filed Aug. 6, 1959, Ser. No. 836,565
13 Claims. (Cl. 261—93)

This invention relates to means for aerating a liquid in a basin and particularly to an improved mechanical aerator of the type using atmospheric air for aeration.

It is an object of this invention to provide a mechanical aerator of this general type which is simple in construction and economical in operation.

Another object is to provide an aerator of the type referred to which is capable of supplying oxygen from the atmosphere to the liquid at any desired rate.

Another object is to provide an aerator which is efficient with regard to power consumption.

Other objects will become apparent upon consideration of the specification and the claims which follow.

Mechanical aerators using atmospheric air have been widely used over a long period of time. However, due to their relatively complicated and expensive construction, their limitations in the capacity of supplying oxygen and their relatively high power consumption per pound of oxygen supplied, the trend in recent years has been toward diffused air aeration.

We have found that a mechanical aerator can be very simple in construction and can supply oxygen from the atmosphere at any desired rate and with a power consumption which compares favorably with the power per pound of oxygen supplied required for diffused air aeration.

The invention comprises a mechanical aerator which is so shaped, and mounted in such relation to the surface of a body of liquid to be aerated, and is rotated at such speed as to draw large quantities of air from the atmosphere into the liquid and which, at the same time, keeps the liquid uniformly mixed and dissolves and distributes the air through and incorporates it in a large mass of circulating liquid. Depending on the size and shape of the basin which holds the liquid, one or several aerators may be used.

The invention will be more readily understood by reference to the drawing, wherein like reference characters in the several figures designate similar elements.

FIGURE 1 is a vertical cross sectional view of a liquid holding basin with aerators according to the invention installed therein;

FIGURE 2 is a partial diagrammatical view of the flow pattern set up by an aerator according to the invention;

FIGURE 3 illustrates the use of an aerator according to the invention in combination with a gas disperser using compressed air;

Figure 5:
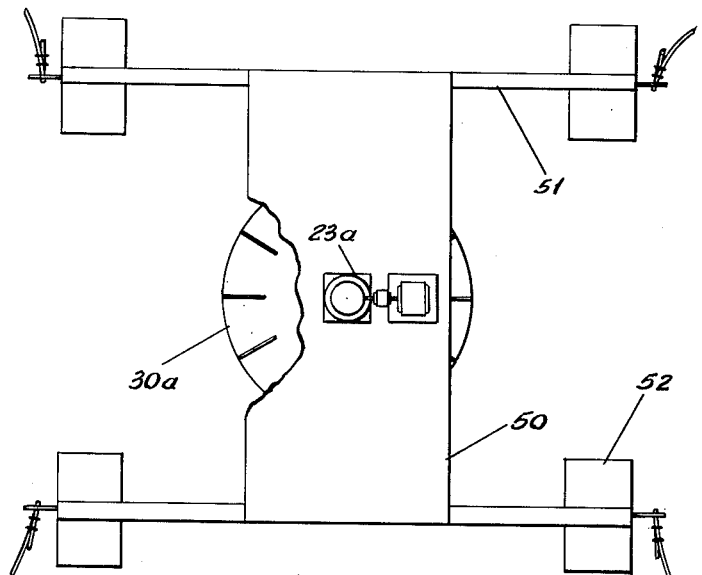
FIGURE 5 is a plan view of the apparatus of FIGURE 4.

FIGURE 1 shows a relatively shallow liquid holding basin 10 which may have any desired shape such as round, square, or rectangular and a substantially flat bottom 11. A liquid inlet conduit 12 leads from a source of liquid to be aerated, not shown, to the basin 10. A liquid outlet conduit 14 leads from the basin 10, preferably from a launder 15 having an overflow 16 establishing a liquid level in the basin.

One or a plurality of aerators 20 are mounted in the basin 10. While two aerators are shown in FIGURE 1, it will be obvious that any number of aerators may be provided and that the number will depend on the size of the basin and of the individual aerators.

An aerator 20 according to the invention comprises a rotor 21, affixed to a shaft 22, which is driven by a suitable motor-reducer 23. The aerator 20 may be supported in any suitable manner, as by a bridge 25 extending across the basin, such as shown in FIGURE 1, or by the columns 26 of FIGURE 3 which rise from the basin floor 11 to an elevation above the overflow 16 and carry a platform 27 on which the motor-reducer 23 rests.

The rotor 21 of the aerator 20 has a plate 30 affixed to the shaft 22. The plate 30 is mounted near but below the liquid surface, as shown; the distance between the plate 30 and the liquid surface should not exceed 0.2 of the diameter of the plate 30. Blades 32 extend vertically downwardly from the plate 30. While only two blades 32 are shown for the sake of clarity, usually at least eight, and with large rotors more blades will be used. The blades 32 extend substantially radially inwardly from the periphery of the plate 30 toward the shaft 22 and may have a width of from one-sixth to one-eighth of the plate diameter. The length of the blades is important for obtaining good results; it should not be less than 0.1 and not more than 0.2 of the diameter of the plate.

Upper blades 34, extending vertically upwardly from the upper face of the plate 30, are also shown in the drawing. These blades may have the same width as the lower blades 32, but are considerably shorter. Their length should not exceed 0.05 of the plate diameter and may be less. In some instances the upper blades will be omitted.

The motor-reducer 23 must be capable of rotating the rotor 21 at a peripheral speed of from 10 to 17 ft./sec. (feet per second). This speed of rotation, and the dimensions given above for the distance between the rotor plate 30 and the liquid surface, and for the length of the blades 32 and 34, are quite critical and must be maintained in order to obtain satisfactory results.

The rotor 21 has a double action. Its plate 30 sets up a strong pumping action which pulls large quantities of liquid from the bottom portion of the basin 10. The liquid is then thrown outwardly in all directions and flows along the liquid surface to the wall of the basin, then downwardly along the basin wall to the lower portion of the basin, to be pumped upwardly again by the rotor. In this manner the liquid in the basin is kept uniformly mixed. In addition to this three-dimensional vortex flow, numerous eddies are set up adjacent the liquid surface in the vicinity of the rotor, the liquid being so violently churned that its surface is somewhat higher at this location than more remote from the rotor, as indicated in FIGURE 2. It will be obvious that the pattern is the same, but in opposite direction, on the other side of the rotor, which is not shown in the drawing. Due to this turbulence at the liquid surface, large amounts of air are drawn into the liquid and are quickly incorporated in the large quantity of liquid in the vortex flow. A very efficient introduction of air into and mixing with the liquid takes place.

When several aerators are used in a basin, they are arranged so that their influence zones will be about tangent, to provide uniform aeration and mixing of the entire basin contents.

Oxygen from the atmosphere can be supplied by the aerator 20 at any desired rate. We have found in extensive tests and plant scale operation that the power consumption will be within the range from 2.5 to 3.5 lbs. of $O_2$ per hour horsepower.

To be useful as an aerator, the rotor 21 must be mounted near the liquid surface, the distance between rotor plate 30 and liquid surface not to exceed one-fifth of the plate diameter. To keep the entire liquid in the basin well mixed, the aerator of our invention, therefore, is placed preferably in a relatively shallow basin, so that the pumping action of the rotor plate pulls the liquid up from the bottom.

The utility of the aerator is, however, not limited to shallow basins. We have found that the aerator can be used with advantage in a deep basin in which a mechanical aerator dispersing compressed air is mounted near the bottom. Such a combination is shown diagrammatically in FIGURE 3. The aerator 20 may be constructed and mounted relative to the liquid surface in the same manner as described in connection with FIGURE 1, and may be supported in any suitable manner, such as shown, for example, in FIGURE 1 or FIGURE 3, and will set up the same flow pattern as shown in FIGURE 2, drawing large quantities of atmospheric air into the liquid and keeping the liquid within its sphere of influence well mixed with the air. The liquid below the sphere of influence of the aerator 20 is aerated by an air disperser 40 which is mounted on shaft 22 near the bottom of the basin 10. The air disperser 40 is of the known type which sets up a large vortex flow and breaks up compressed air discharged below the disperser into very fine bubbles which are incorporated and dispersed throughout the vortex flow.

The air disperser 40 comprises a rotor 41 including a plate 42 which is affixed to the shaft 22, and a plurality of vertical blades 44 mounted on the lower face of the plate 42 and extending from the periphery of the plate part way to the shaft 22. The length of the blades 44 is not critical, nor is the vertical distance of the plate 42 from the basin floor. Compressed air is introduced into the basin 10 through an air line 45 and discharged below the rotor 41 through a sparger ring 46.

The diameter of the air disperser 40 preferably is smaller than the diameter of the aerator 20, as shown in FIGURE 3, so that the peripheral velocity of the air disperser is lower than that of the aerator. This velocity is not critical and can be adjusted to varying conditions by selecting a proper size of the rotor 41.

In using air dispersers, such as disperser 40, in deep basins, it has been usual to mount two or more of the dispersers on the same shaft. We have found that the combination of an aerator according to the invention with an air disperser, such as 40, results in power savings, i.e., the horsepower required per hour for supplying a predetermined amount of oxygen to the liquid in the basin 10 is less when using the new aerator together with the air disperser, than when using two air dispersers on a common shaft. Thus the new aerator has also definite utility in connection with deep basins.

Figure 4:
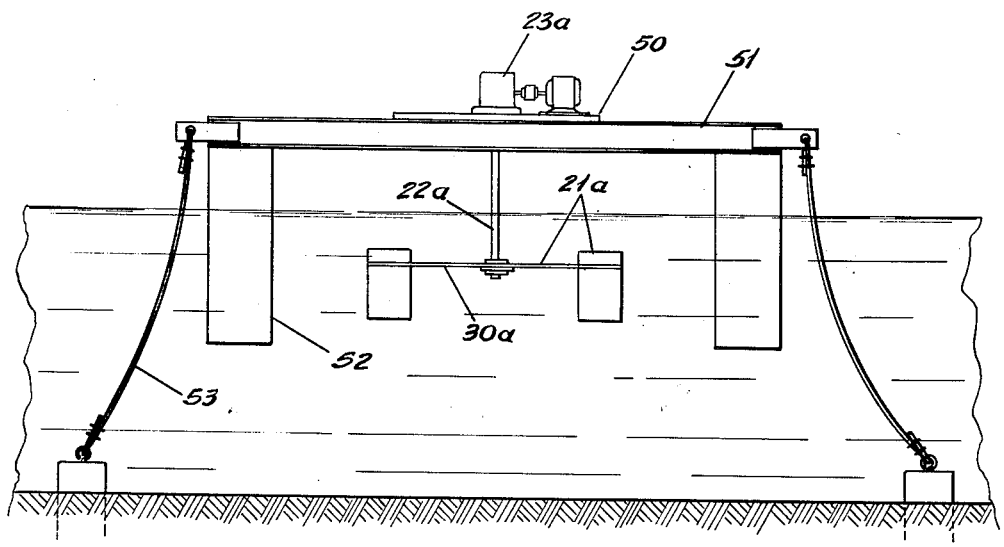
FIGURE 4 is a vertical cross sectional view, partly broken away, of a liquid holding basin with an aerator according to the invention mounted on a floating support.

A special problem arises when the liquid level in the basin holding the body of liquid to be aerated is variable. This is the case, for example, in most lagoons. To maintain under such circumstances the predetermined critical submergence of the rotor plate of not more than 0.2 of the plate diameter, the aerator is mounted on a floating raft so that its vertical position will vary with the liquid level. FIGURES 4 and 5 show diagrammatically such an arrangement. The motor reducer 23a, shaft 22a and rotor 21a with its plate 30a are the same as in the other figures. The motor-reducer 23a rests on a cross beam 50 connecting two beams 51 which are supported by floats 52 a suitable distance above the liquid surface. The assembly of beams and floats is properly anchored by cables 53 to the shore or, as shown, to the bottom of the lagoon. After initial adjustment to the critical submergence of the rotor plate, this submergence will be maintained automatically by movement of the floats in response to changes in the liquid level. Thus it is possible to obtain the full benefits of the invention despite wide variation in the liquid level.

This application is a continuation-in-part of copending application Serial No. 757,036, filed August 25, 1958, now abandoned.

We claim:

1. Apparatus for aerating a body of liquid comprising a basin confining said body of liquid, said basin being free of partitions and of obstructions to flow in any direction, a rotatable vertical shaft extending into said body of liquid in said basin, a rotor affixed to said shaft, means for supporting said shaft in such manner that said rotor is always a predetermined distance below the surface of said body of liquid, said rotor including a horizontally extending plate and blade means supported by said plate, said blade means extending inwardly from the periphery of said plate partway toward said shaft, the maximum length of said blade means being a small fraction only of the diameter of said plate, the maximum value of said predetermined distance being one fifth of the diameter of said plate, whereby said rotor, upon its rotation, sets up a three-dimensional vortex flow of liquid pumped up from the lower portion of said body of liquid and discharged outwardly along the surface of said body of liquid, and simultaneously causes churning and raising of the liquid surface in the vicinity of said rotor to entrain air from the atmosphere into the liquid and incorporate it in said vortex flow, and means for rotating said rotor at a peripheral speed of from about 10 to about 17 feet per second.

2. The apparatus of claim 1, wherein said blade means extend from the lower face of said plate and have a maximum vertical extension of 0.2 of the plate diameter.

3. The apparatus of claim 2, wherein said blade means include also a plurality of blades affixed to the upper face of said plate, the maximum vertical extension of said blades being 0.05 of the plate diameter.

4. Apparatus for aerating a body of liquid comprising a basin free of partitions and obstructions to flow and provided with means establishing a liquid level therein, a rotatably mounted vertical shaft extending into said basin, a rotor affixed to said shaft below the liquid level established by said means, said rotor having a plate and blade means supported by said plate, said blade means extending inwardly from the periphery of said plate, the maximum vertical extension of said blade means being from an elevation above said plate of 0.05 of the plate diameter to an elevation below said plate of 0.2 of the plate diameter, the width of said blade means being within the range of from one sixth to one eighth of the plate diameter, said rotor being affixed to said shaft with its plate spaced below said liquid level a maximum distance of 0.2 of the plate diameter, and means for rotating said shaft at a speed resulting in a peripheral velocity of said rotor of from about 10 to about 17 feet per second.

5. A surface aerator of the type supplying atmospheric air to a body of liquid, said aerator comprising a plate and blade means supported by said plate and extending from the periphery of said plate inwardly partway toward its center, means for supporting said aerator with its plate in horizontal position below the surface of said body of liquid and with said blade means extending downward therefrom, the maximum distance between said plate and the surface of said body of liquid being one fifth of the diameter of said plate, said blade means having vertical extension of from 0.1 to 0.2 of the plate diameter, and means for rotating said aerator with a peripheral speed of the blades of from 10 to 17 feet per second.

6. Apparatus for supplying oxygen from the atmosphere to a body of liquid comprising a basin confining said body of liquid, said basin being free of partitions and obstructions to flow and provided with an overflow, a plate extending horizontally in said basin at an elevation spaced below said overflow, the maximum distance between said overflow and said plate being one fifth the diameter of said plate, a plurality of blades affixed to the lower face of said plate, said blades extending inwardly from the periphery of said plate partway to its center, the length of said blades being from one tenth to one fifth the diameter of said plate, and means for rotating said plate with a peripheral speed of the blades of from 10 to 17 feet per second.

7. An aerator according to claim 6, including a plurality of support columns extending upwardly from the floor of the basin to an elevation above said overflow, and a platform supported on said columns, said means for rotating said plate being supported on said platform.

8. Apparatus for aerating a body of liquid having a variable liquid level, comprising a basin free of partitions and obstructions to flow confining said body of liquid, a floating raft in said basin, means for anchoring said raft to said basin, motor means supported on said raft above the liquid surface, said motor means having an output shaft extending into said body of liquid, and a rotor connected to said output shaft, characterized by said rotor having a plate and blade means mounted on said plate and extending inwardly from its periphery partway toward its center, the maximum length of said blade means being a small fraction of the diameter of said plate, said rotor being affixed to said output shaft with its plate spaced below the liquid surface, the maximum distance between said plate and said liquid surface being one fifth of said plate diameter, said motor means rotating said shaft at a speed resulting in a peripheral velocity of said plate of from about ten to about seventeen feet per second.

9. Apparatus for aerating a body of liquid comprising a basin confining said body of liquid, said basin being free of partitions and of obstructions to flow in any direction, a rotatable vertical shaft extending into said body of liquid in said basin, a first rotor affixed to said shaft, means for supporting said shaft in such manner that said first rotor is always a predetermined distance below the surface of said body of liquid, said rotor including a horizontally extending plate and blade means supported by said plate, said blade means extending inwardly from the periphery of said plate partway toward said shaft, the maximum length of said blade means being a small fraction only of the diameter of said plate, the maximum value of said predetermined distance being one fifth of the diameter of said plate, whereby said first rotor, upon its rotation, sets up a three-dimensional vortex flow of liquid pumped up from a lower portion of said body of liquid and discharged outwardly along the surface of said body of liquid, and simultaneously causes churning and raising of the liquid surface in the vicinity of said rotor to entrain air from the atmosphere into the liquid and incorporate it in said vortex flow, a second rotor affixed to said shaft at an elevation spaced below said first rotor, said second rotor including a plate and blades supported by said plate and extending downwardly therefrom and inwardly from the plate periphery partway toward said shaft, and inlet means for air under pressure discharging underneath the plate of said second rotor, said second rotor being so shaped and positioned relative to said body of liquid in said basin to set up, upon its rotation, a three-dimensional vortex flow in a portion of said body of liquid below the portion wherein said first rotor sets up a vortex flow, and to break up air bubbles discharged through said air inlet means and disperse them through its vortex flow, and means for rotating said shaft at a speed resulting in a peripheral velocity of said first rotor of from about 10 to about 17 feet per second.

10. An aerator of the type supplying atmospheric air to a body of liquid in a basin, said aerator comprising a plate rotatably mounted in said basin in horizontal position at an elevation a predetermined distance below the surface of said body of liquid, the maximum distance between said plate and said liquid surface being one fifth of the plate diameter, means for maintaining said predetermined distance, a plurality of blades extending downward from said plate and inward from the plate periphery partway toward its center, the length of said blades being within the range of from one tenth to one fifth the diameter of said plate, and means for rotating said plate at a peripheral velocity of from about 10 to about 17 feet per second.

11. Apparatus for aerating a body of liquid, comprising a basin free of partitions and obstructions to flow holding said body of liquid, a rotor in said basin at an elevation below the surface of said body of liquid, and means for maintaining a predetermined distance between said rotor and said surface, characterized in that said rotor comprises a rotatably mounted plate, said plate being in horizontal position in said basin at said predetermined distance, the maximum distance between said plate and said liquid surface being one fifth of the plate diameter, and blade means affixed to the lower side of said plate and extending inwardly from its periphery, said blade means having a maximum vertical extension of 0.2 of the plate diameter, and means for rotating said rotor at a peripheral velocity of about ten to seventeen feet per second.

12. The apparatus of claim 11, wherein said means for maintaining said predetermined distance comprise an overflow from said basin.

13. The apparatus of claim 11, wherein said means for maintaining said predetermined distance comprise a floating raft supporting said plate.

References Cited in the file of this patent

UNITED STATES PATENTS

| | | |
|---|---|---|
| 302,326 | D'Heureuse | July 22, 1884 |
| 2,165,889 | Fischer et al. | July 11, 1939 |
| 2,171,893 | Robinson | Sept. 5, 1939 |
| 2,190,852 | Tucker | Feb. 20, 1940 |
| 2,243,302 | Weinig | May 27, 1941 |
| 2,424,679 | Cowles | July 29, 1947 |
| 2,520,540 | Green | Aug. 29, 1950 |
| 2,615,698 | Valentine | Oct. 28, 1952 |
| 2,639,129 | De Rosset | May 19, 1953 |
| 2,652,924 | Wunsch | Sept. 22, 1953 |
| 2,678,913 | Kalinske | May 18, 1954 |
| 2,714,056 | Poffenberger | July 26, 1955 |
| 2,802,647 | Bolton | Aug. 13, 1957 |
| 2,871,109 | Snyder et al. | Jan. 27, 1959 |

FOREIGN PATENTS

| | | |
|---|---|---|
| 9,309 | Australia | Aug. 30, 1933 |
| 72,224 | Denmark | Feb. 19, 1951 |